United States Patent
Kikuchi

[11] Patent Number: 6,154,423
[45] Date of Patent: Nov. 28, 2000

[54] RECORDING MEDIUM IDENTIFYING DEVICE

[75] Inventor: Hideo Kikuchi, Miyagi-ken, Japan

[73] Assignee: ALPS Electric Co., Ltd., Tokyo, Japan

[21] Appl. No.: 09/165,903

[22] Filed: Oct. 2, 1998

[30] Foreign Application Priority Data

Oct. 2, 1997 [JP] Japan ................................. 9-269714

[51] Int. Cl.[7] ............................................. G11B 17/22
[52] U.S. Cl. ............................................. 369/36; 369/178
[58] Field of Search ........................ 369/36, 178, 191, 369/192, 193, 194, 75.1, 75.2, 52; 360/96.5, 98.04, 98.05, 98.06

[56] References Cited

U.S. PATENT DOCUMENTS

| | | | |
|---|---|---|---|
| 4,021,856 | 5/1977 | Motoyama et al. | 360/74.3 |
| 4,158,865 | 6/1979 | Sato | 360/73.07 |
| 4,799,116 | 1/1989 | Ida et al. | 360/74.1 |
| 5,345,343 | 9/1994 | Miura et al. | 360/60 |
| 5,371,644 | 12/1994 | Hoge et al. | 360/132 |
| 5,557,589 | 9/1996 | Mukawa et al. | 369/13 |
| 5,574,705 | 11/1996 | Suzuki | 369/36 |
| 6,031,811 | 2/2000 | Umesaki et al. | 369/178 |

FOREIGN PATENT DOCUMENTS

| | | |
|---|---|---|
| 0265167 A2 | 4/1988 | European Pat. Off. . |
| 0554065 A2 | 8/1993 | European Pat. Off. . |
| 0717405 A2 | 6/1996 | European Pat. Off. . |
| 4-321958 | 11/1992 | Japan . |
| 6-76453 | 3/1994 | Japan . |
| 6-223460 | 8/1994 | Japan . |

*Primary Examiner*—William R. Korzuch
*Assistant Examiner*—Julie Anne Watko
*Attorney, Agent, or Firm*—Brinks Hofer Gilson & Lione

[57] ABSTRACT

A recording medium identifying device has a medium detecting section including a detecting arm which contacts from outside the outside surface of a package containing recording media inside, the package can freely be inserted into, and taken out of, an device body. The recording medium identifying device comprises: a holder rotatably supported on a first spindle provided on the device body, and a second spindle mounted on the holder; on the second spindle the detecting arm is rotatably supported; on the device body is mounted a moving member which moves in interlock with package insertion. The moving member moves, on the way of package insertion into the device body, to thereby turn the holder in a direction in which the second spindle goes away from the package mounting area, thereby holding the detecting arm in a retreat position where the detecting arm is off the package. After or immediately before the completion of package insertion, the moving member moves to turn the holder, thus moving the second spindle towards the package to enable the detecting arm to detect the medium detecting section of the package.

19 Claims, 9 Drawing Sheets

RECORDING MEDIUM IDENTIFYING DEVICE

BACKGROUND OF THE INVENTION

1. Field of the Invention

The present invention relates to a recording medium identifying device in which a package containing one disk or a plurality of disks such as CD, CD-ROM, DVD, PD, etc., or a package containing a built-in recording means other than the disk, is mounted to the body of the device.

2. Description of the Prior Art

There have been proposed various kinds of optical disk media. For example, disk media of pit-modulation system are CD (Compact Disk), CD-ROM (CD-Read Only Memory), and CD-R (CD-Rewritable) which allows only one time of recording. Also, a phase-modulation type recordable/reproduceable medium is a PD (Power Disk), and recordable/reproduceable media of photo electromagnetic system are MO (Magneto-Optical Memory), and HS (Hyper Storage). Furthermore, large-capacity disks for audio system, video system, and computer data, are DVD-ROM (Digital Versatile Disk) of pit-modulation system, and recordable/reproduceable DVD-RAM (DVD-Random Access Memory) of phase-modulation system. Also there is a photo electromagnetic recordable/reproduceable minidisk for use in audio systems and computers.

As a disk unit for driving the above-described disks there are a system in which a single disk, any one of the above-described disks, is mounted, and a system in which a plurality of disks of the same type are mounted and one of these disks mounted is selected and driven.

Furthermore, there has recently been proposed such a disk unit that has a disk driving means capable of driving both CD and DVD, that is, is capable of accommodating both CD and DVD.

The above-described disk unit capable of accommodating different types of disks, however, is mainly designed to mount CD or DVD separately one by one, and not to mount different types of disks at the same time. Particularly, it has not been taken into consideration to adopt such a combination that allows mounting both a playback-only disk and a recordable disk at the same time in one disk unit, for instance a combination of CD or CD-ROM and DVD-RAM, or a combination of DVD-ROM and DVD-RAM. Considering the diversity of future utilization of the optical disk media, diversification of computer software, and an increase in the capacity of data demanded, the advent of a disk unit capable of mounting different types of disks at the same time is desired.

In the disk unit designed to separately mount different types of conventional disks, such as CD and DVD, the type of the disks mounted is determined by reading TOC data of the disks by means of an optical head, or by detecting a difference in thickness from the surface of the disk cover to the recording surface, or by detecting track density. Therefore, there is the problem that it takes much time to determine the type of a disk after mounting and further till transfer to reproducing operation.

Furthermore, in a disk unit designed to accommodate both a playback-only disk such as DVD-ROM and a recordable disk such as DVD-RAM, if there takes place an error in deciding the type of the disks mounted in the disk unit, the DVD-ROM will be mistaken as DVD-RAM. Therefore it can be predicted that there will occur such a problem that a laser power for recording will be given to the DVD-ROM, crashing data stored in the DVD-ROM.

It is, therefore, necessary to identify, on the device body side, whether a plurality of disks mounted are of a RAM or ROM system when the disks are mounted. For instance, when a disk package containing a plurality of disks and provided, on the outside face, with a disk identification section for identifying the disks inside, is mounted in the device body, it is necessary to detect the disk identification section by means of a detecting arm provided on the device body.

In this case, however, if the detecting arm is constantly pressed towards the package mounting area, the detecting arm will slide on the outside face of the package when the package is inserted, resulting in an increased load at the time of package insertion. Besides, the detecting arm contacts the package every time the package is inserted and taken out, with the result that the detecting arm will get fatigued, being broken at the time of package insertion.

The above-described problem of the identifying device arises similarly not only in a disk package but a tape package, and further in a package containing a single or a plurality of memory elements, and provided with a detecting portion on the outside face with which a detecting arm on the device side will contact.

SUMMARY OF THE INVENTION

In view of the above-described problem of the prior art device, the present invention has an object to provide a recording medium identifying device in which a detecting arm contacts the detecting portion of a package to detect the type of recording media only after or immediately before the package is fully inserted, in order that load during package insertion can be decreased and the detecting arm can be prevented from damage.

In the recording medium identifying device of the present invention a medium detecting section is provided on the outside surface of a recording medium package which a detecting arm contacts from outside; and the package can freely be inserted into, and taken out of, the device body. The recording medium identifying device has a holder rotatably supported on a first spindle provided on the device body, and a second spindle mounted on the holder. On the second spindle the detecting arm is rotatably supported. On the device body is mounted a moving member which moves in interlock with package insertion. As the moving member moves, on the way of package insertion into the device body, to thereby turn the holder in a direction in which the second spindle goes away from the package mounting area, thereby holding the detecting arm in a standby state where the detecting arm is off the package. After or immediately before the completion of package insertion, the moving member moves to turn the holder, thus moving the second spindle towards the package to enable the detecting arm to detect the medium detecting section of the package.

According to the present invention, when the package is mounted in the device body, the detecting arm moves away from the package mounting area; therefore the detecting arm is not slide on the package, thus enabling to reduce load at the time of package insertion and also to prevent giving damage to the detecting arm.

For example, the detecting arm has a detecting portion extended in one direction from the support portion supported by the second spindle into contact with the medium detecting section of the package, and a base portion extended in the other direction from the support section. The device body is provided with a switch oppositely to the base portion, so that when the second spindle is approaching the package mounting area, the switch will be turned on and off in accordance with projections and depressions of the medium detecting section of the package where the detecting portion contacts.

The moving member operates in interlock with a locking mechanism which locks the package inserted, or an ejection member for ejecting the package. It is pushed together with the package into the device body. Or other mechanism may be used.

It should be noted that the detecting arm itself may be are silent member and pressed against the package. Furthermore, the detecting arm may serve as a contact, which contacts a memory board or a detecting contact provided on the package, to thereby detect the type of the recording media and contents of information recorded.

For example, it is desirable to provide a locking section which locks the base portion of the detecting arm on the opposite side of the package mounting area when the second spindle moves away from the package mounting area, thus turning the detecting arm in a direction in which the detecting portion is moved away from the medium detecting section.

In the above-described structure, the second spindle is moved a little away from the package mounting area, so that the detecting portion of the detecting arm can reliably move away from the package mounting area.

The holder is of such a structure that the second spindle is pressed to turn towards approaching the package mounting area, so that the second spindle or the holder will be turned by the moving member away from the package mounting area.

It is to be noticed that the holder may be forced to move by the moving member in a direction in which the second spindle will approach the package mounting area.

Furthermore, the package contains a plurality of disks as recording media, and projections and depressions appear according to the type of the plurality of disks in the medium detecting section of the package. On the second spindle, therefore, a plurality of detecting arms for detecting the types of the plurality of disks are supported.

In this case, in the medium detecting section for example, the package has an opening as a window; and a tray where the disk is mounted has projections and depressions in accordance with the type of the disk to be mounted, the projections and depressions being detected through the window by means of the detecting portion of the detecting arm.

Furthermore, it should be noticed that the package may be designed to contain a single disk, and may be provided with projection and depressions for determining the type of the disk.

BRIEF DESCRIPTION OF THE DRAWINGS

FIGS. 10A and 10B are partially bottom views showing the detecting mechanism after the completion of disk package insertion, in which FIG. 10A shows a RAM disk, while FIG. 10B shows a ROM disk.

DESCRIPTION OF THE PREFERRED EMBODIMENTS

A recording medium identifying device of the present invention will hereinafter be described with reference to the accompanying drawings.

Figure 1:
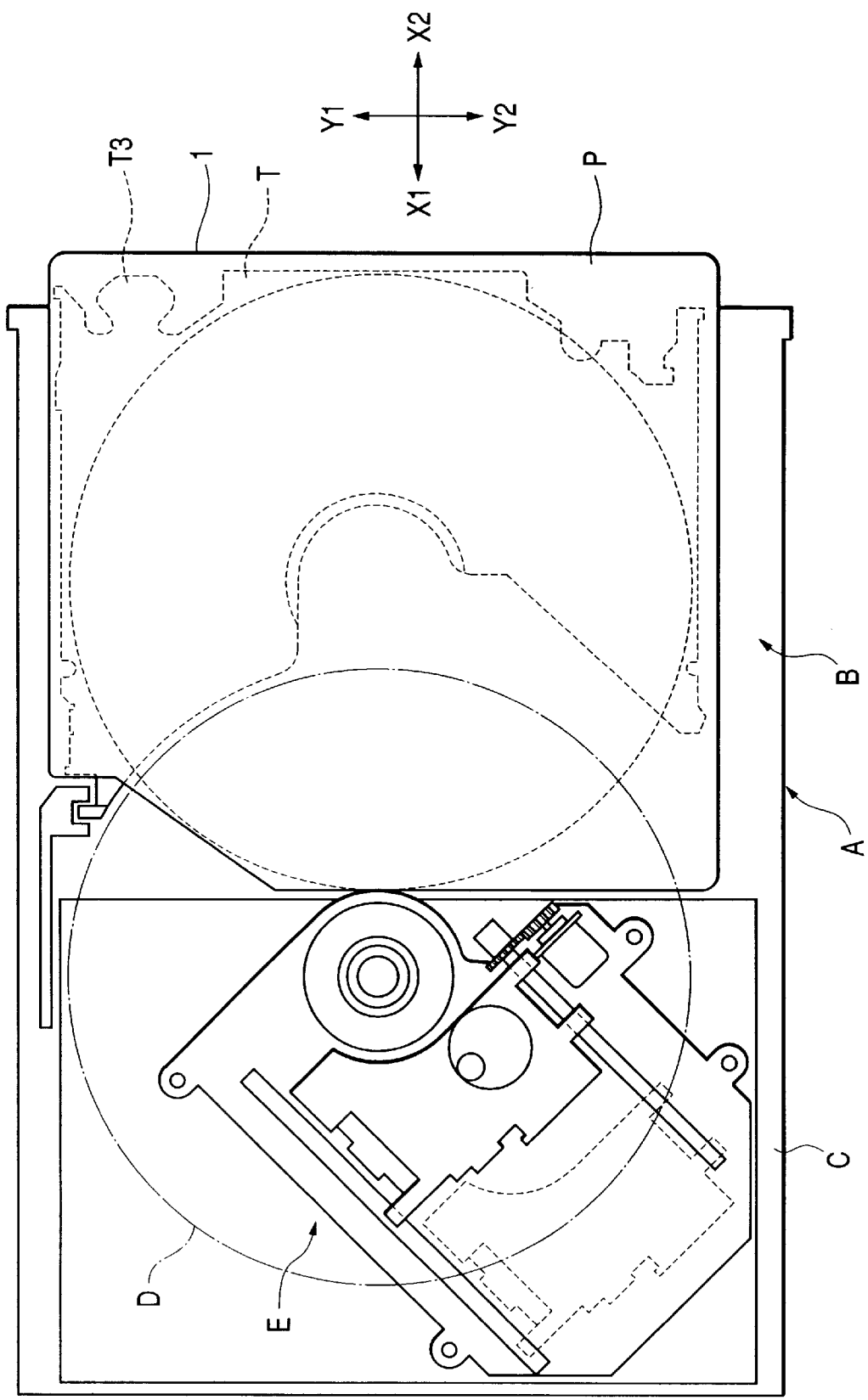
FIG. 1 is a top sectional view of a disk unit.
Figure 2:
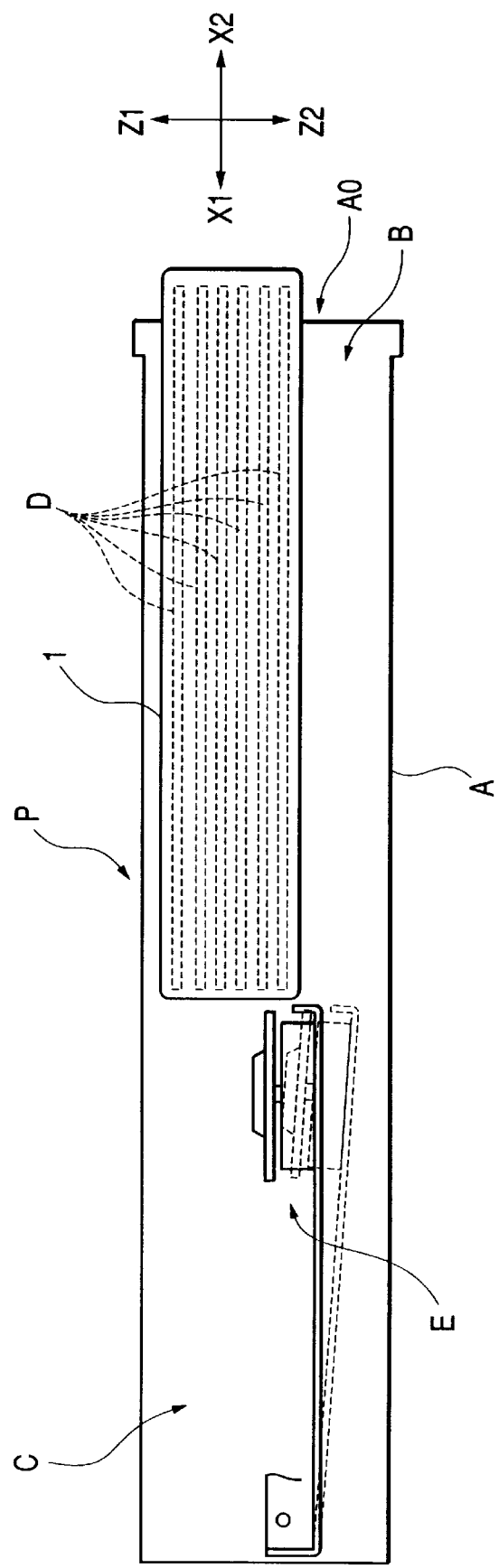
FIG. 2 is a longitudinal sectional view of the disk unit of FIG. 1.
Figure 3:
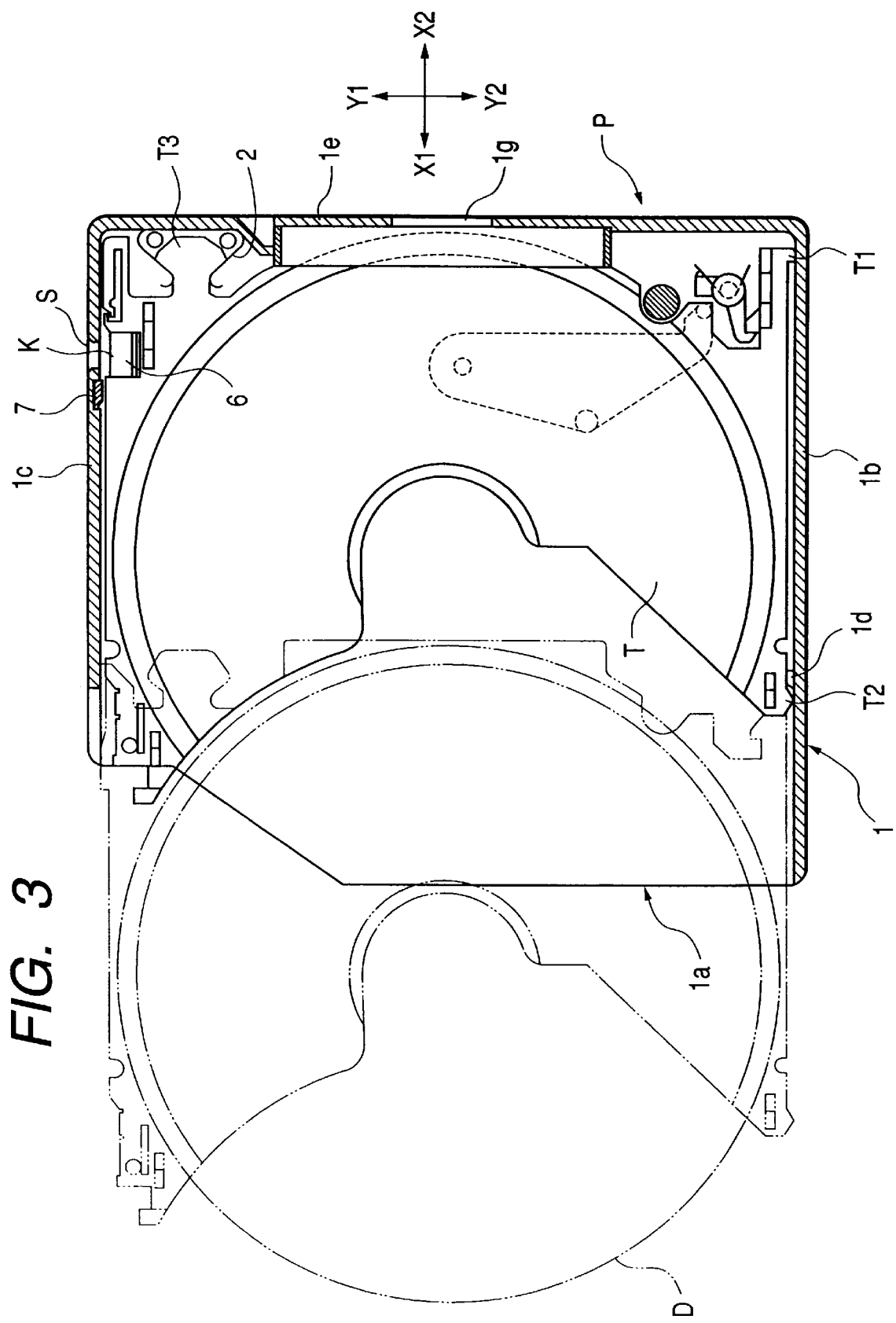
FIG. 3 is a top sectional view of a disk package.
Figure 4:
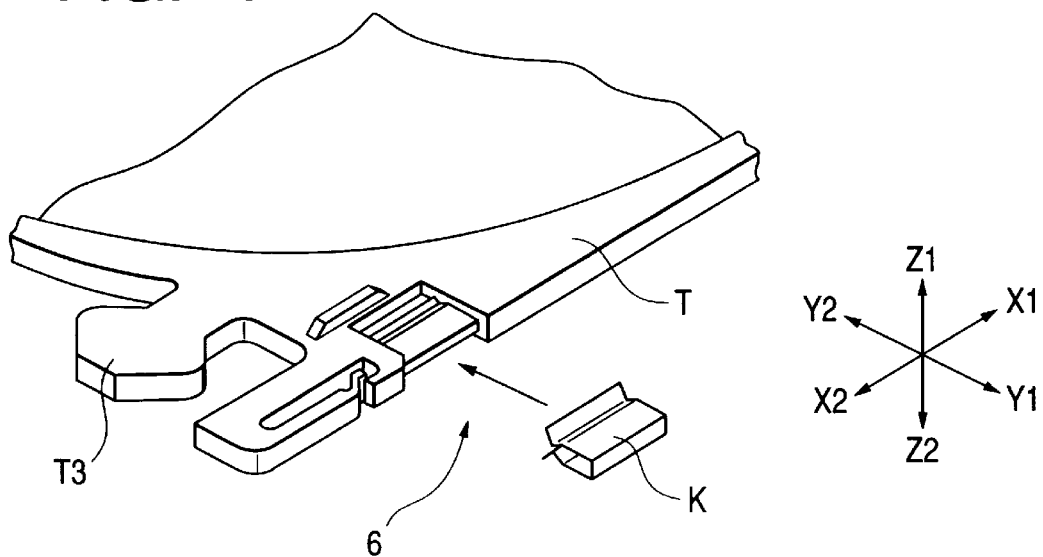
FIG. 4 is a partially perspective view of a tray.
Figure 5:
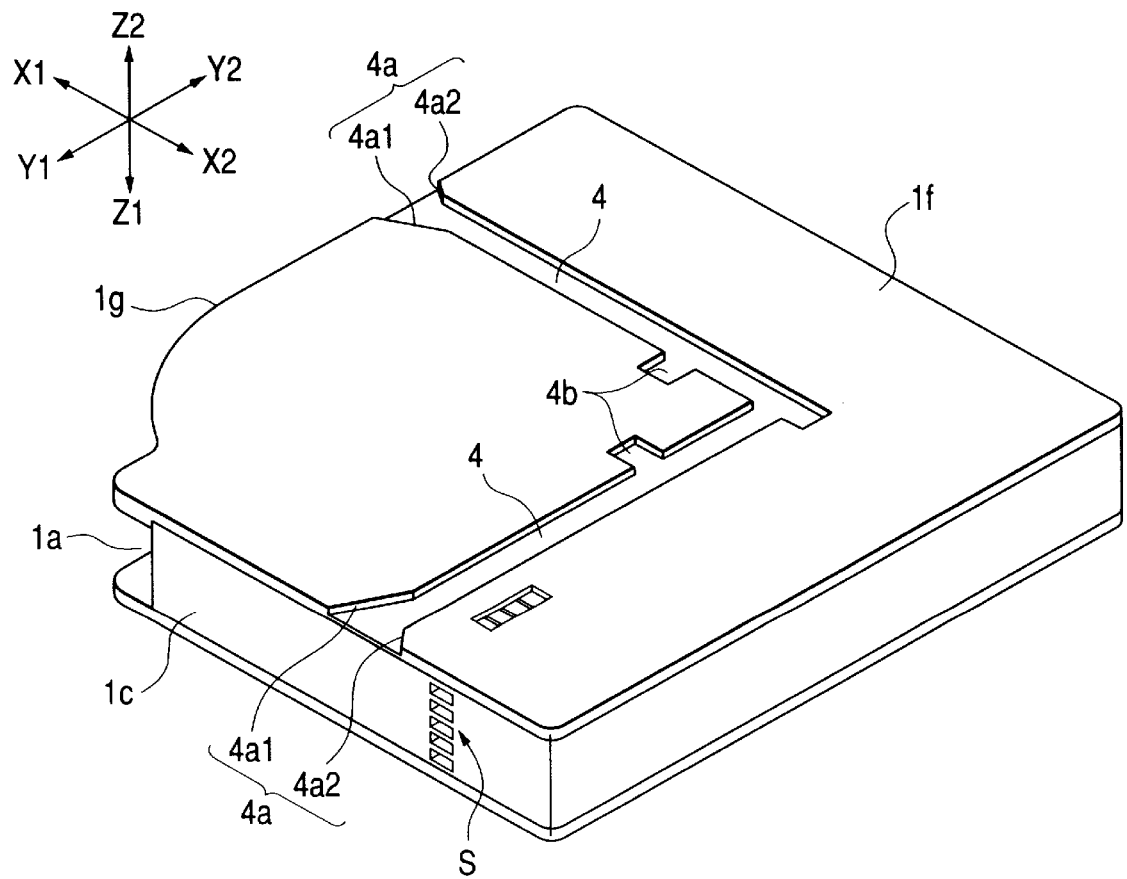
FIG. 5 is a bottom perspective view of the disk package.

FIG. 1 is a top sectional view showing one example of a disk unit to be mounted with a disk package; FIG. 2 is a longitudinal sectional view of FIG. 1; FIG. 3 is a top sectional view of the disk package; FIG. 4 is a partially perspective view of a tray; and FIG. 5 is a bottom perspective view of the disk package.

The disk unit shown in FIG. 1 and FIG. 2 is rectangular in the top view of a main housing A which comprises an device body. In the main housing A are a disk package P mounting area B and a disk drive area C; in the disk drive area C a disk driving means E is provided for driving a disk D drawn out of the disk package P.

The disk package P is inserted into the main housing A of the disk unit, in the direction X1 of FIG. 1 and FIG. 2 from the front in the longitudinal direction of a rectangular shape.

The disk package P can contain a plurality of 120 mm-diameter disks and 80 mm-diameter disks. Furthermore, both a playback-only ROM disk and a recordable RAM disk are housed together. The ROM disks are CD and DVD-ROM, while the RAM disks are PD and DVD-RAM. The 80 mm-diameter disk is a single CD.

The disk package P has a synthetic resin casing 1. The casing 1 is provided with an opening section 1a on the left side in FIG. 3 and FIG. 5. The opening section 1a is an outlet for drawing out the tray T and the disk D.

In the casing 1 are housed a plurality of trays T, which can freely be drawn out. In the depicted example, the casing 1 can accommodate five trays T. On the inner surface of the left side plate 1b and right side plate 1c of the casing 1 a plurality of unillustrated horizontal ribs are protrusively formed. The right and left side edge portions of each tray T are guided between the horizontal ribs, each tray T being slidable in the X direction.

On one side edge of the tray T (the lower side edge in the drawing), as shown in FIG. 3, a restricting projection T1 is formed on the right end and a restricting projection T2 is protrusively formed on the left end; and on the inner surface of the left side plate 1b of the casing 1 a stopper projection 1d is integrally formed between these restricting projections T1 and T2.

On the other side edge (the upper side edge in the drawing), there is provided a recording medium detected section 6 as shown in FIG. 4. On the inner surface of the right side plate 1c of the casing 1, a locking mechanism 7 is provided as shown in FIG. 3. The recording medium detected section 6 is comprised of a clip K which can be extended out in the Y direction in the drawing. The clip K can be set to extend by two steps out in the Y direction; for instance when a ROM disk is to be mounted in the tray T, the clip K is pressed fully in the Y direction, being set in a position in which the clip K will not project out in the Y2 direction over the side edge of the tray T. When a RAM disk is mounted, the clip K is set in a position where the clip K will project out in the Y2 direction over the side edge of the tray T. In the tray T mounted with the RAM disk which projects largely, the clip K set as stated above will be engaged with the locking mechanism 7 when the tray T is drawn out, thereby locking all the tray T from projecting out of the casing 1. Also in the tray T mounted with the ROM disk, the clip K will not be engaged with the locking mechanism 7, and therefore the tray T can easily be drawn out.

When the disk package P has been removed from the disk unit, therefore, the tray T can not be easily drawn out, thereby enabling to prevent accidental interchange between the RAM and ROM disks even in the case of a third person's misoperation and also to prevent impairing or staining the recording surface of the RAM disk.

When the disk package P has been mounted in the mounting area B of the disk unit, the locking mechanism 7 is moved up or down to unlock the clip K by means of an unillustrated unlocking mechanism; thus the tray T mounted with the RAM disk becomes ready to be drawn out to the disk drive area C. Therefore, at the point of time the disk package P is mounted, the disks D, regardless of RAM or ROM disks, can freely be transferred between the disk drive means E and the tray T.

On the right end side in the drawing of each tray T, a holding projection T3 is protrusively and unitarily formed. Inside of the right front plate 1e of the casing 1 in the drawing, there is provided a plate spring 2 for holding the holding projection T3 of each tray T.

As indicated by a solid line in FIG. 3, with the tray T set within the casing 1, the holding projection T3 of the tray T is held by the plate spring 2 to prevent each tray T from jumping out of the opening 1a and also to prevent occurrence of vibration.

Furthermore, as shown in FIG. 3, there are formed slits S comprising a plurality of through holes, in a position corresponding to the medium detected section 6, in the right side plate 1c of the casing 1. The number of the slits S is the same as the number of the trays T provided in the casing 1. Also, as shown in FIG. 3, in the state that the tray T is held within the casing 1, the clip K and the slits S are oppositely located.

In the bottom surface 1f of the disk package P are formed guide grooves 4 as shown in FIG. 5. The guide grooves 4 shown in FIG. 5 are formed in two directions of X and Y. The guide groove 4 formed in the direction of X axis is used when inserting the disk package P in the X1 direction in relation to the device body (disk unit) as shown in FIG. 1. In the meantime the guide groove 4 formed in the direction of Y axis is for use in the disk unit in which the disk package P is inserted in the Y1 direction. On the forward end of the guide grooves 4 (X1 and Y1 sides in the drawing) an expanded portion 4a is formed by the inclined portions 4a1 and 4a2. In the depth on the X2 and Y1 sides, lock grooves 4b are formed. The guide groove 4, as described later on, is utilized as a guide primarily for insertion of the disk package.

Figure 6:
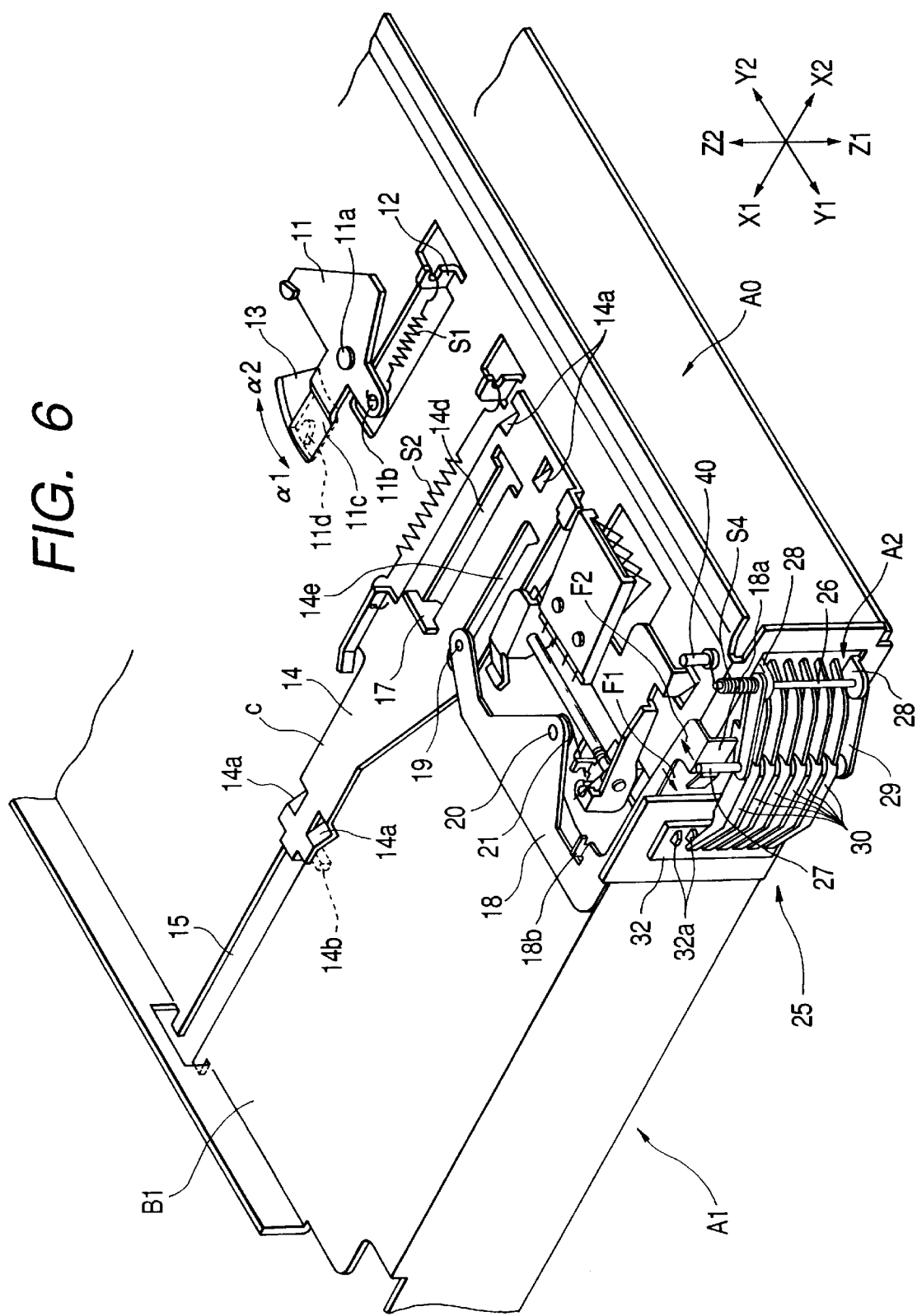
FIG. 6 is a rear perspective view of a mechanical structure of the package mounting area of the device body.

FIG. 6 is a bottom perspective view of the disk unit, showing the mechanical structure provided at the bottom of the package mounting area of the housing.

Numeral 11 in FIG. 6 denotes a lock member formed of a synthetic resin by an injection molding process. The lock member 11 is rotatable on the fulcrum of the spindle 11a, and is pressed in the direction α1 in the drawing by a pressing member S1 such as a coil spring installed between a hole 11b formed in the lock member 11 and a locking section 12 formed by bending from the housing A. The forward end 11c of the lock member 11 is bent in the Z1 direction in the drawing, being inserted into a sectorial hole 13 made in the housing A. Therefore the lock member 11 is rotatable substantially within the range of the sectorial hole 13. On the forward end 11c an approximately triangular projecting portion 11d is unitarily formed, projecting toward the disk package P mounting area B in the Z1 direction in the drawing.

At the bottom section B1 of the mounting area B, an ejection plate 14 is provided. The ejection plate 14 is a press-formed metal plate, and has four V-shaped sliding portions 14a on the end side in the X1 and X2 directions, so that the ejection plate 14 is movable on the bottom section B1 in the X direction in the drawing. At the end of the ejection plate 14 in the X1 direction is provided a T-shaped receiving section 14b which is bent in the Z1 direction in the drawing. The receiving section 14b is inserted in a guide groove 15 formed in the bottom section B1. The ejection plate 14 has a guide groove 14d, in which a T-shaped projection 17 bent from the bottom section B1 is inserted. The ejection plate 14, therefore, is guided along the guide groove 15 and the guide groove 14d, moving straight in the X direction.

Figure 7:
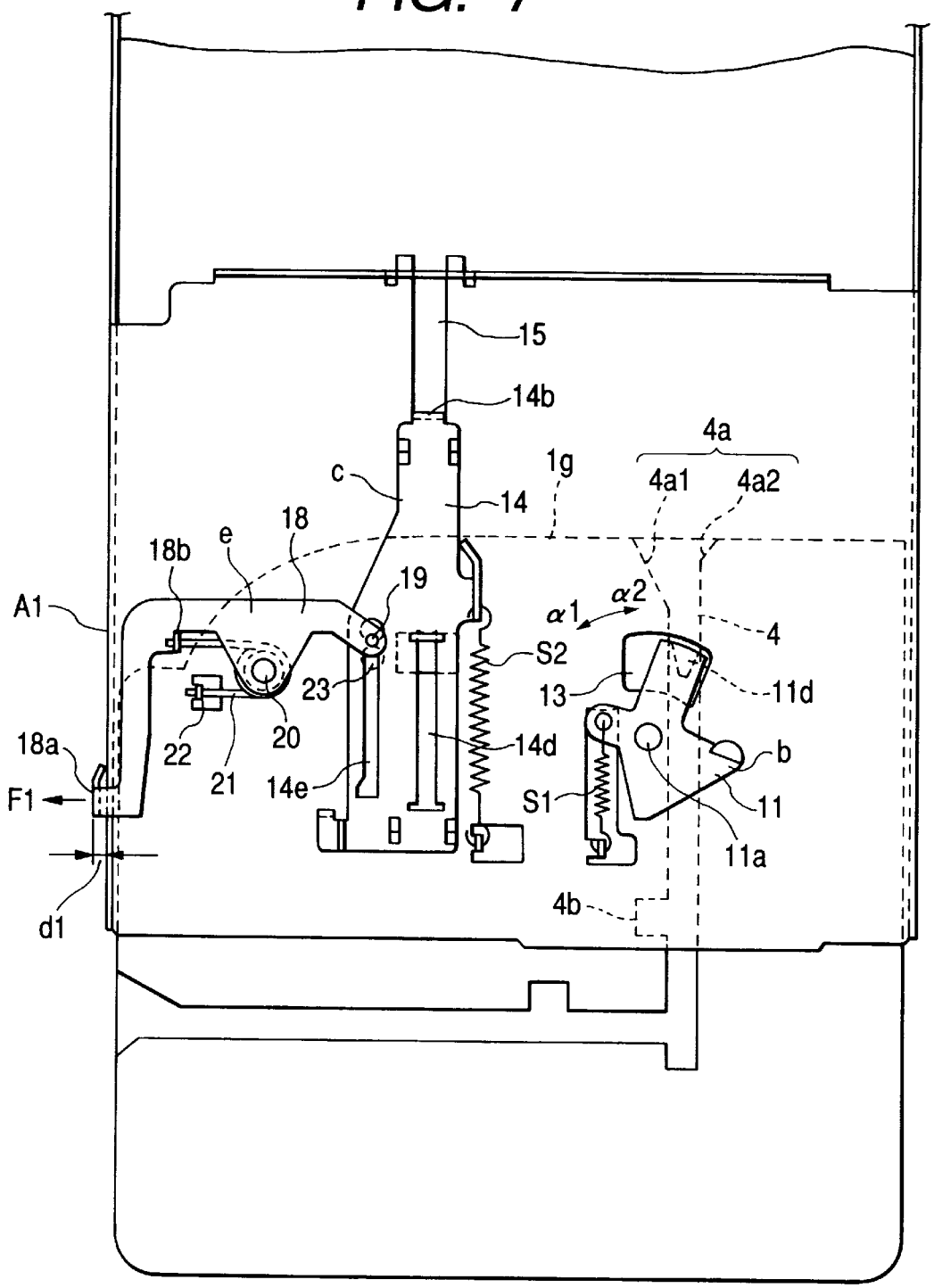
FIG. 7 is a bottom view of the disk package inserted halfway.
Figure 8:
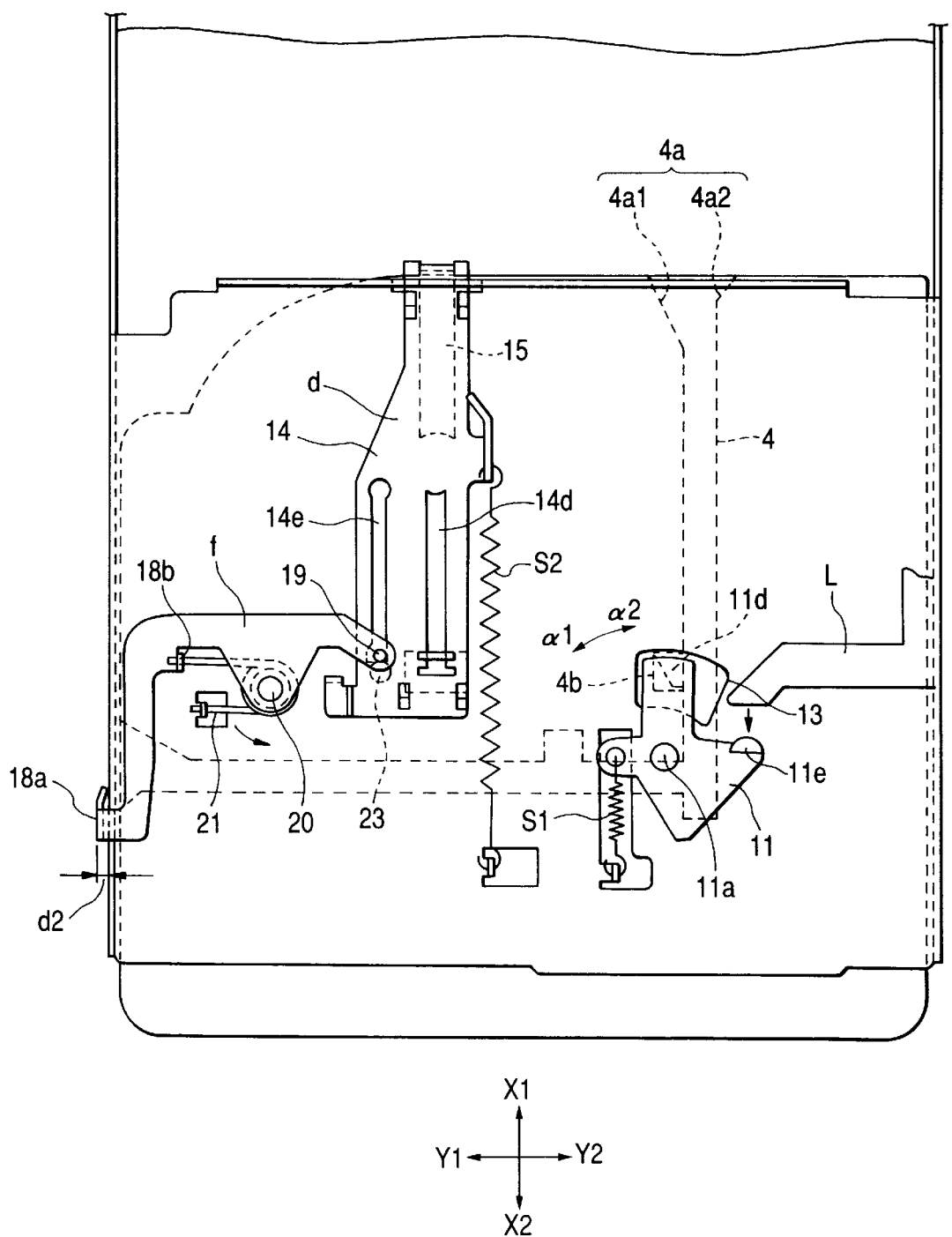
FIG. 8 is a bottom view of the disk package after completion of insertion.

In a position adjacent to the guide groove 14d a long hole 14e is made. Numeral 18 denotes a drive pin 19 provided on one end of the interlock arm; the drive pin 19 is inserted in the long hole 14e. The interlock arm 18 is produced of an approximately K-shaped metal plate by the punching process, and is rotatably supported on a pivot 20. The other end extends in the X2 direction in the drawing. On this end is formed a moving member 18a bent in the Z1 direction in the drawing along the side face A1 of the main housing A. As shown in FIG. 6 to FIG. 8, a torsion spring 21 is inserted over the pivot 20 of the interlock arm 18 and the torsion spring 21 is retained at one end by the locking section 22 formed by bending on the bottom section B1, and at the other end by the locking section 18b of the interlock arm 18. Therefore, the interlock arm 18 is pressed in the counterclockwise direction in the drawing.

On the bottom section B1, however, a projection 23 is formed in contact with the drive pin 19 as shown in FIGS. 7 and 8, thereby restricting the clockwise rotation of the interlock arm 18. Also, as the interlock arm 18 is pressed clockwise, a first force F1 is exerted to the moving member 18a in a direction in which the moving member 18a moves away from the side face A1. Furthermore, as shown in FIG. 6, a detecting mechanism 25 is mounted on the side face A1 of the main housing A.

In the detecting mechanism 25 a first spindle 26 is provided in support sections 28, 28 formed by bending in the Y2 direction in the drawing from the side face A1 of the main housing A. On this first spindle 26 a holder member 29 is rotatably supported. The holder member 29 has a fixed second spindle 27, on which a plurality of detecting arms 30 are rotatably mounted.

Figure 9:
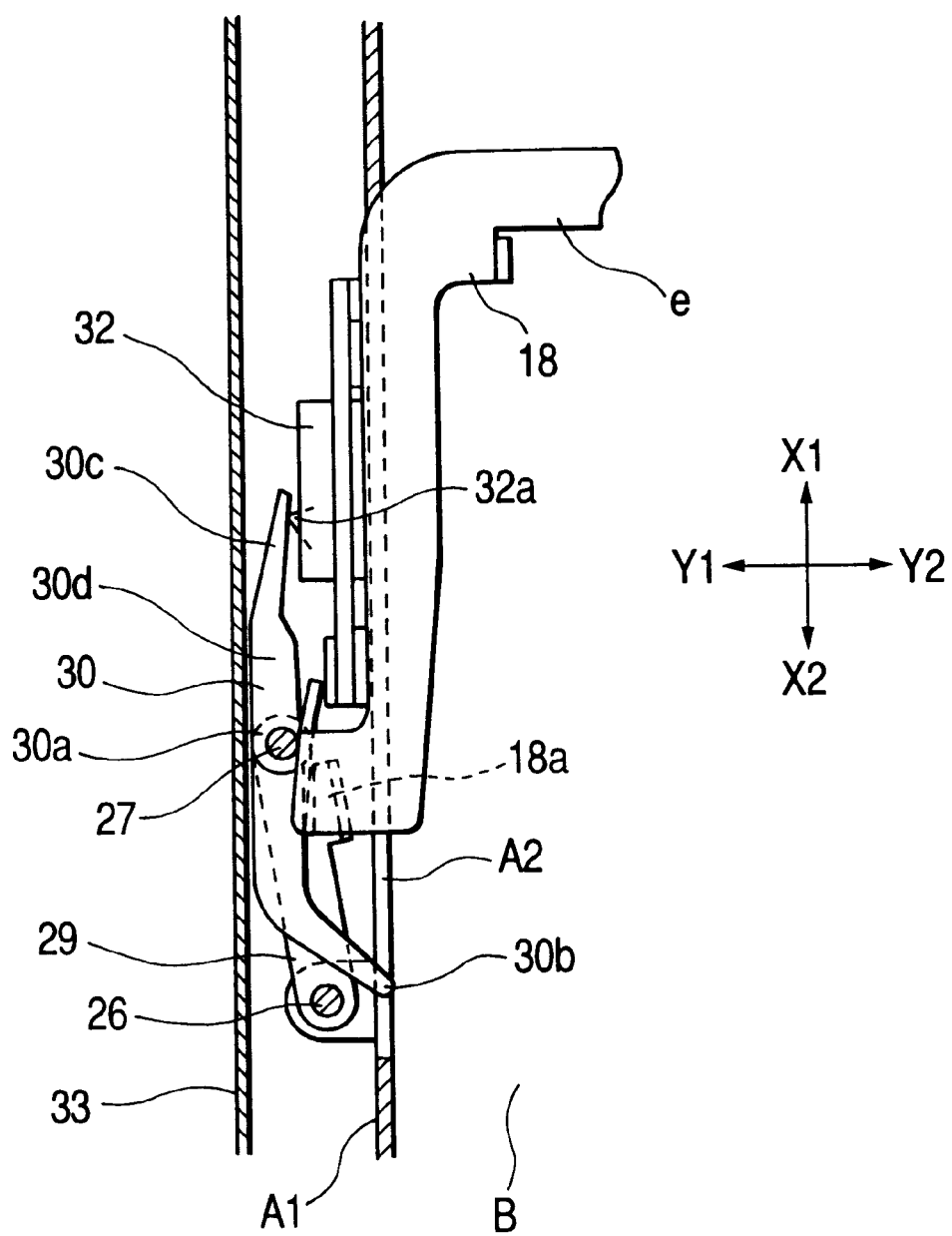
FIG. 9 is a partially bottom view showing the detecting mechanism before disk package insertion.

Furthermore, a second force F2 turning on the center of the first spindle 26 is applied to the second spindle 27 in the clockwise direction in the drawing (in a direction in which the second spindle 27 approaches the side face A1 of the main housing A); in this state the moving member 18a of the interlock arm 18 is being pressed by the extended portion extending in the Z2 direction in the drawing. However, since the first force F1 acting on the moving member 18a is greater than the second force F2 (F1>F2), the holder member 29 is off the side face A1 and the second spindle 27 is off the disk mounting area B in the wait position, thus keeping balance as shown in FIG. 9 described later. The second force F2 is realized by inserting a coil spring S4 over the extended end of the first spindle 26 in the Z2 direction as shown in FIG. 6, with its one end retained on the second spindle 27 and the other end retained on the retaining projection 40 on the bottom section B1.

The detecting arm 30, as shown in FIG. 9, is comprised of a turning portion (support portion) 30a at center, a detecting pawl (detecting portion) 30b curved towards the side face A1 on one side of this turning portion 30a and a pressing portion (base portion) 30c extended on the other side. These members are unitarily molded of a synthetic resin. The detecting arm 30 is rotatably supported on the second spindle 27 at the turning portion 30a. The detecting pawl 30b is positioned oppositely to the through hole A2 provided in the side face A1; with the counterclockwise turn of the detecting arm 30, the detecting pawl 30b passes the side face A1 to approach the disk package P side. On the other hand the pressing portion 30c faces the detecting switch 32 located on the side face A1. The detecting arm 30, turning clockwise, can depress each of a plurality of push buttons 32a provided on the detecting switch 32.

Operation of the recording medium identifying device of the present invention will hereinafter be described.

FIG. 7 is a bottom view showing the disk package inserted halfway; and FIG. 8 is a bottom view showing the state of an interlock arm after the completion of disk package insertion. In FIG. 7 and FIG. 8 the detecting mechanism 25 is not shown.

The disk package P is inserted in the insertion port A0 of the housing A in the X1 direction in the drawing as shown in FIG. 2. At this time, the relationship between the bottom surface 1f of the disk package P and the bottom section B1 of the mounting area B is as follows.

When the disk package P is inserted into the insertion port A0, the approximately triangular projection 11d formed on the lock member 11 contacts the inclined portion 4a forming the expanded portion 4a shown in FIG. 5. Then the projection 11d is turned in the α2 direction in FIG. 4 along the inclined portion 4a1. When the disk package P is inserted, the projection 11d slides along the guide groove 4, coming as far as the lock groove 4b. The lock member 11 is turned in the α1 direction by the force of the pressing member S1 shown in FIG. 8, and accordingly the projection 11d enters the lock groove 4b, thus being in the locked state a. As the disk package P is locked by the locking mechanism, the insertion of the disk package P into the mounting area B is accomplished.

Furthermore, as shown in FIG. 6, the ejection plate 14, before the insertion of the disk package P, is pressed by the pressing member S2, being held in the extreme end on the X2 side indicated by code c. As the disk package P advances into the mounting area B, the edge 1g of the casing 1 contacts the receiving portion 14b of the ejection plate 14. Furthermore, when the disk package P is inserted, the receiving portion 14b is pushed by the edge 1g towards the depth of the mounting area B. Therefore, the ejection plate 14 moves in the X1 direction in the drawing against the force of the pressing member S2. Then, the disk package P, after completion of insertion, reaches the position indicated by code d shown in FIG. 8. At this time, the projection 11d of the lock member 11 fits in the lock groove 4b as described above, thereby locking the disk package P.

When the ejection plate 14 is in the c position, the drive pin 19 contacts the projection 23, in which position e the interlockarm 18 has been turned fully in the clockwise direction. The drive pin 19 slides in the long hole 14e when the ejection plate 14 moves in the X1 direction. Then, when the ejection plate 14 has reached the d position, the drive pin 19 is pressed by the edge on the X2 side of the long hole 14e, slightly turning counterclockwise as indicated by code f in the drawing.

When the interlock arm 18 is in the position of code e as shown in FIG. 7, the moving member 18a projects out from the side face A1 of the housing A by the amount of projection d1 in the Y2 direction in the drawing. In the meantime, as shown in FIG. 8, when the interlock arm 18 turns as far as the position indicated by code f, the amount of projection of the moving member 18a decreases. Let d2 be the amount of projection, and d1>d2.

When the disk package P is mounted in the mounting area B, the amount of projection of the moving member 18a provided on the forward end of the interlock arm 18 varies.

Next, operation of the detecting mechanism 25 will be explained.

Figure 10A:
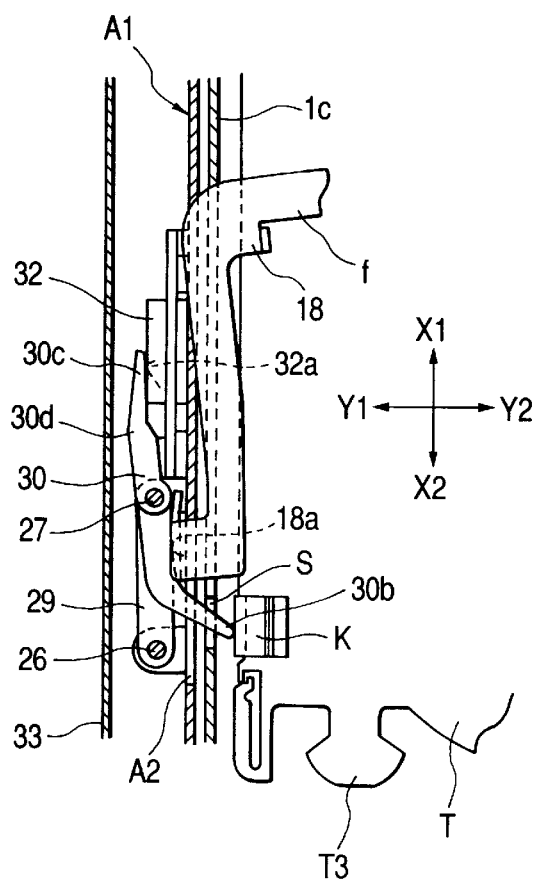
Figure 10B:
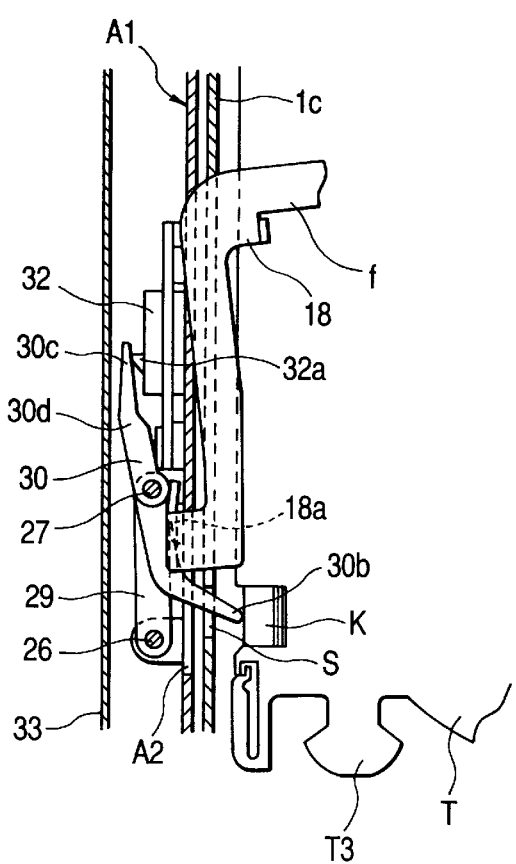

FIG. 9 is a bottom view showing the state of the detecting mechanism 25 before the mounting of the disk package; and FIG. 10 shows the state of the detecting mechanism 25 after the completion of mounting of the disk package, in which FIG. 10A shows the state of detection of a RAM disk, and FIG. 10B shows the state of detection of a ROM disk.

As shown in FIG. 9, when the interlock arm 18 is in the e position and the moving member 18a protrudes by the amount of projection d1 in the 2 direction in the drawing, out from the side face A1 of the housing A, the holder member 29 turns counterclockwise on the first spindle 26 in accordance with the relationship between the first force F1 and the second force F2. Thus the second spindle 27 becomes a refuge position off from the side face A1 towards the Y1 direction. At this time, the back portion 30d of the pressing section 30c which makes the base of the detecting arm 30 contacts the inner wall restraint section of the exterior housing 33 located on the Y2 side in the drawing, pressing the detecting arm 30 slightly clockwise on the center of the second spindle 27 as a fulcrum.

In FIG. 9, therefore, with the slight clockwise turn of the detecting arm 30 on the center of the second spindle 27, the detecting pawl 30b which functions as the detecting portion moves away from the disk package P mounting area B. Therefore, when the interlock arm 18 is in the e position, that is, on the way of insertion (ejection) of the disk package P, the right plate 1c of the casing 1 is off the detecting pawl 30b, and therefore the disk package P can smoothly be inserted into, or ejected from, the mounting area B.

As shown in FIG. 9, the second spindle 27 moves slightly in the Y1 direction, and the detecting arm 30 is turned clockwise by the inner wall restraint section of the exterior housing 33, to thereby retreat the detecting pawl 30b. Therefore, the amount of movement of the second spindle 27 in the Y1 direction decreases, enabling mounting the detecting mechanism 25 in a narrow space. It is, therefore, unnecessary to use a spring for each of the detecting arms 30 to turn the detecting arm 30 clockwise in FIG. 9, thereby resulting in a decreased quantity of component parts.

Next, when the mounting of the disk package P into the mounting area B has been completed, the disk package P is as shown in FIG. 10A or FIG. 10B.

In FIG. 10A, the RAM disk is set in the tray T; in this state, the clip K provided on the side edge of the tray T is stuck out. As shown in FIG. 8, when the mounting of the disk package P into the mounting area B has been completed, the interlock arm 18 turns to the f position and the moving member 18a protrudes by the amount of projection d1. Therefore, the holder member 29 is turned clockwise by the action of the second force, causing the second spindle 27 to approach in the direction of the side face A1. At this time, the back section 30d on the pressing portion 30c moves away from the inner wall restraint section of the exterior housing 33. Therefore, the clockwise pressure acting on the detecting arm is released to free the detecting arm. Also, the through hole A2 provided in the side face A1 of the housing A and the slit S provided in the right side plate 1c of the casing 1 face each other. Then, as the second spindle 27 approaches in the direction of the side face A1, the detecting pawl 30b of the detecting arm 30 goes through the through hole A2 and the slit S to come into contact with the clip K which has been stuck out.

In FIG. 10A, since the detecting pawl 30b is pressed by the clip K in the Y1 direction, the detecting arm 30 turns clockwise in the drawing, thereby depressing by the pressing portion 30c the pushbutton 32a of the detecting switch 32 to output an ON signal. In the disk unit, therefore, the ON signal is detected to identify the RAM disk.

Furthermore, as shown in FIG. 10B, when a ROM disk is mounted in the tray T and the clip K provided on the side edge of the tray T is in a retreat position, no pressure acts in the Y1 direction on the detecting pawl 30b of the detecting arm 30. Therefore, since the pushbutton 32a of the detecting switch 32 is not depressed by the pressing portion 30c, an OFF signal will be outputted. In the disk unit, therefore, the OFF signal is detected to identify the presence of the ROM disk.

The type of a disk package can be grasped by the ON/OFF state of the pushbutton 32a which is outputted according to the projected state of the clip K provided on the tray T.

Furthermore, unlike a conventional device, it is unnecessary to mount a disk in a disk drive means E to read TOC data by an optical head, or to detect a difference in thickness from the cover surface of the disk to the recording surface, or to detect track density.

That is, since it becomes possible to detect the type of disks nearly simultaneously with the completion of insertion of the disk package P into the mounting area B, it is possible to decrease the time required to identify the type of disks, that is, RAM or ROM disks, mounted in the tray T.

The disk package P can be taken out by the following procedure.

To take out the disk package P, first an eject button provided on a operation panel of the disk unit or a remote control unit is operated. When the eject button is depressed, an unlock lever L shown in FIG. 8 is moved in the X2 direction in the drawing by an unillustrated unlocking mechanism, thus pushing the projection 11e protrusively provided on the locking member 11. Therefore, the locking member 11 turns in the α2 direction in the drawing, to thereby release the projection 11d from the lock groove 4b to unlock the disk package P into the unlock state b.

Then the ejection plate 14 is moved in the X2 direction in the drawing by the restoring force of the pressing member S2, so that the receiving portion 14b provided on the forward end of the ejection plate 14 pressed the edge 1g of the disk package P in the X2 direction. Therefore, the disk package P is ejected at the insertion port A0 with the movement of the ejection plate 14 from the d position to the c position.

At this time, since the pressure of the driving pin 19 is released by the end on the X2 side of the long hole 14e, the interlock arm 18 returns from the f position to the e position.

Therefore, the moving member 18a is pushed again by the first force F1 in a direction in which the first spindle 26 will move away from the side face A1 of the main housing A. Thus the holder member 29 is turned to move the detecting arm 30 to the standby position which is apart from the side face A1. Then, the 30d of the pressing portion 30c side of the detecting arm 30 contacts the inner wall of the exterior chassis 33, being slightly pressed clockwise. The detecting arm 30, as heretofore described, is slightly turned clockwise and the detecting pawl 30b is ready to be drawn fully out of the slit S. Thus the disk package P ejecting operation can smoothly be performed.

According to the present invention described above, when the package containing a recording medium is mounted in the device body, the detecting portion of the detecting arm comes off from the package mounting area. Therefore, the load at the time of package insertion is not increase, and the detecting arm will neither get fatigued and broken.

What is claimed is:

1. A recording medium identifying device comprising a detecting arm, wherein said detecting arm contacts from outside an outside surface of a package containing recording media inside, said package comprising a medium detecting section on said outside surface and said package can freely be inserted into, and taken out of, a device body; said recording medium identifying device comprising:

a holder rotatably supported on a first spindle provided on said device body;

a second spindle mounted on said holder, said detecting arm being rotatable supported on said second spindle;

a moving member mounted on said device body, said moving member moving in interlock with package insertion into said device body;

wherein said moving member moves, during package insertion into said device body, to turn said holder in a direction in which said second spindle retreats from a package mounting area, thereby holding said detecting arm in a retreat position where said detecting arm does not contact said package;

one of after and immediately before completion of package insertion, said moving member moves to turn said holder, thus moving said second spindle towards said package to enable said detecting arm to detect said medium detecting section of said package;

said detecting arm has a detecting portion which extends in one direction from a support portion of said second spindle into contact with said medium detecting section of said package, and a base extending in another direction from said support portion; and a switch is mounted on said device body opposite to said base, in order that when said second spindle has approached said package mounting area, said switch will be turned on or off in accordance with a state of projections and depressions of said medium detecting section of said package on which said detecting portion contacts.

2. A recording medium identifying device according to claim 1, further comprising a restraining section to restrain said base of said detecting arm from a reverse side of said package mounting area and to turn said detecting arm to move the detecting portion away from said medium detecting section when said second spindle moves away from said package mounting area.

3. A recording medium identifying device according to claim 2, wherein said holder is pressed to turn in a direction in which said second spindle approaches said package mounting area, and one of said second spindle and said holder is turned by said moving member away from said package mounting area.

4. A recording medium identifying device according to claim 3, wherein:
   a plurality of disks as recording media are contained in said package;
   projections and depressions are disposed on said medium detecting section of said package according to a type of said plurality of disks mounted; and
   a plurality of said detecting arms to detect the type of said plurality of disks are supported on said second spindle.

5. A recording medium identifying device according to claim 4, wherein said package has openings as windows in said medium detecting section; and
   projections and depressions are formed in trays in which disks are mounted, according to a type of disks mounted in said trays, such that said projections and depressions are detected through said windows by a detecting portion of said detecting arm.

6. A recording medium identifying device according to claim 3, wherein said package has openings as windows in said medium detecting section; and
   projections and depressions are formed in trays in which disks are mounted, according to a type of disks mounted in said trays, such that said projections and depressions are detected through said windows by a detecting portion of said detecting arm.

7. A recording medium identifying device according to claim 2, wherein:
   a plurality of disks as recording media are contained in said package;
   projections and depressions are disposed on said medium detecting section of said package according to a type of said plurality of disks mounted; and
   a plurality of said detecting arms to detect the type of said plurality of disks are supported on said second spindle.

8. A recording medium identifying device according to claim 7, wherein said package has openings as windows in said medium detecting section; and
   projections and depressions are formed in trays in which disks are mounted, according to a type of disks mounted in said trays, such that said projections and depressions are detected through said windows by a detecting portion of said detecting arm.

9. A recording medium identifying device according to claim 2, wherein said package has openings as windows in said medium detecting section; and
   projections and depressions are formed in trays in which disks are mounted, according to a type of disks mounted in said trays, such that said projections and depressions are detected through said windows by a detecting portion of said detecting arm.

10. A recording medium identifying device according to claim 1, wherein said holder is pressed to turn in a direction in which said second spindle approaches said package mounting area, and one of said second spindle and said holder is turned by said moving member away from said package mounting area.

11. A recording medium identifying device according to claim 10, wherein:
    a plurality of disks as recording media are contained in said package;
    projections and depressions are disposed on said medium detecting section of said package according to a type of said plurality of disks mounted; and
    a plurality of said detecting arms to detect the type of said plurality of disks are supported on said second spindle.

12. A recording medium identifying device according to claim 11, wherein said package has openings as windows in said medium detecting section; and
    projections and depressions are formed in trays in which disks are mounted, according to a type of disks mounted in said trays, such that said projections and depressions are detected through said windows by a detecting portion of said detecting arm.

13. A recording medium identifying device according to claim 10, wherein said package has openings as windows in said medium detecting section; and
    projections and depressions are formed in trays in which disks are mounted, according to a type of disks mounted in said trays, such that said projections and depressions are detected through said windows by a detecting portion of said detecting arm.

14. A recording medium identifying device according to claim 1 wherein:
    a plurality of disks as recording media are contained in said package;
    projections and depressions are disposed on said medium detecting section of said package according to a type of said plurality of disks mounted; and
    a plurality of said detecting arms to detect the type of said plurality of disks are supported on said second spindle.

15. A recording medium identifying device according to claim 14, wherein said package has openings as windows in said medium detecting section; and
    projections and depressions are formed in trays in which disks are mounted, according to a type of disks mounted in said trays, such that said projections and depressions are detected through said windows by a detecting portion of said detecting arm.

16. A recording medium identifying device according to claim 1, wherein said package has openings as windows in said medium detecting section; and
    projections and depressions are formed in trays in which disks are mounted, according to a type of disks mounted in said trays, such that said projections and depressions are detected through said windows by a detecting portion of said detecting arm.

17. A recording medium identifying device comprising a detecting arm, wherein said detecting arm contacts from outside an outside surface of a package containing recording media inside, said package comprising a medium detecting section on said outside surface and said package can freely be inserted into, and taken out of, a device body; said recording medium identifying device comprising:
    a holder rotatably supported on a first spindle provided on said device body;
    a second spindle mounted on said holder, said detecting arm being rotatable supported on said second spindle;
    a moving member mounted on said device body, said moving member moving in interlock with package insertion into said device body;
    wherein said moving member moves, during package insertion into said device body, to turn said holder in a direction in which said second spindle retreats from a package mounting area, thereby holding said detecting arm in a retreat position where said detecting arm does not contact said package;
    one of after and immediately before completion of package insertion, said moving member moves to turn said holder, thus moving said second spindle towards said package to enable said detecting arm to detect said medium detecting section of said package;

a plurality of disks as recording media are contained in said package;

projections and depressions are disposed on said medium detecting section of said package according to a type of said plurality of disks mounted; and a plurality of said detecting arms to detect the type of said plurality of disks are supported on said second spindle.

18. A recording medium identifying device according to claim 17, wherein said package has openings as windows in said medium detecting section; and projections and depressions are formed in trays in which disks are mounted, according to a type of disks mounted in said trays, such that said projections and depressions are detected through said windows by a detecting portion of said detecting arm.

19. A recording medium identifying device comprising a detecting arm, wherein said detecting arm contacts from outside an outside surface of a package containing recording media inside, said package comprising a medium detecting section on said outside surface and said package can freely be inserted into, and taken out of, a device body; said recording medium identifying device comprising:

a holder rotatably supported on a first spindle provided on said device body;

a second spindle mounted on said holder, said detecting arm being rotatably supported on said second spindle;

a moving member mounted on said device body, said moving member moving in interlock with package insertion into said device body;

wherein said moving member moves, during package insertion into said device body, to turn said holder in a direction in which said second spindle retreats from a package mounting area, thereby holding said detecting arm in a retreat position where said detecting arm does not contact said package;

one of after and immediately before completion of package insertion, said moving member moves to turn said holder, thus moving said second spindle towards said package to enable said detecting arm to detect said medium detecting section of said package;

said package has openings as windows in said medium detecting section; and projections and depressions are formed in trays in which disks are mounted, according to a type of disks mounted in said trays, such that said projections and depressions are detected through said windows by a detecting portion of said detecting arm.

* * * * *